United States Patent [19]

Hensley

[11] Patent Number: 4,811,967
[45] Date of Patent: Mar. 14, 1989

[54] TRAILER HITCH

[76] Inventor: James C. Hensley, R.R. 2, Box 150, Centralia, Ill. 62801

[21] Appl. No.: 92,083

[22] Filed: Sep. 2, 1987

Related U.S. Application Data

[63] Continuation-in-part of Ser. No. 819,590, Jan. 17, 1986, Pat. No. 4,722,542, which is a continuation-in-part of Ser. No. 692,398, Jan. 18, 1985, abandoned.

[51] Int. Cl.$^4$ .............................................. B60D 1/14
[52] U.S. Cl. .................................. 280/479.3; 280/507; 292/257
[58] Field of Search .......... 280/478 B, 478 A, 478 R, 280/477, 507; 292/DIG. 49, 257

[56] References Cited

U.S. PATENT DOCUMENTS

| | | | |
|---|---|---|---|
| 2,133,065 | 10/1938 | Weber | 280/504 |
| 2,704,218 | 3/1955 | Claude-Mantle | 292/DIG. 49 X |
| 2,871,029 | 1/1959 | Demarest | 280/477 |
| 2,940,776 | 6/1960 | Curtis | 280/446 B |
| 3,057,644 | 10/1962 | Fisher | 280/478 A |
| 3,279,819 | 10/1966 | Edmonds | 280/478 B |
| 3,891,237 | 6/1975 | Allen | 280/477 |
| 3,981,517 | 9/1976 | Crochet, Sr. | 280/478 R |
| 4,077,234 | 3/1978 | Crochet, Sr. | 280/478 R X |
| 4,178,011 | 12/1979 | Kirsch | 280/477 |
| 4,196,918 | 4/1980 | Strader | 280/478 R |
| 4,198,073 | 4/1980 | Olsen | 280/406 |
| 4,312,516 | 1/1982 | Olsen | 280/406 |
| 4,511,159 | 4/1985 | Younger | 280/478 R X |
| 4,515,387 | 5/1985 | Schuck | 280/478 B X |
| 4,560,184 | 12/1985 | Williams, Jr. | 280/478 |
| 4,606,549 | 8/1986 | Williams, Jr. | 280/478 |
| 4,613,149 | 9/1986 | Williams, Jr. | 280/508 |

FOREIGN PATENT DOCUMENTS 2057388  5/1972  Fed. Rep. of Germany ...... 280/477

Primary Examiner—David M. Mitchell
Assistant Examiner—Charles R. Watts
Attorney, Agent, or Firm—Gravely, Lieder & Woodruff

[57] ABSTRACT

A hitch for connecting a trailer to a tow vehicle includes a hitch bar which projects from the tow vehicle and a hitch box which receives the end of the hitch bar and is coupled to one trailer through a hitch ball and a socket-type coupler. The hitch bar has a shank provided along its four sides with beveled surfaces that are presented outwardly and rearwardly. The hitch box, on the other hand, has a box-like enclosure provided with a forwardly presented open end through which the shank of the hitch bar projects. The enclosure furthermore contains beveled surfaces which conform to the beveled surfaces on the hitch bar shank and indeed seat against those surfaces when the hitch bar is fully inserted into the hitch box. The beveled surfaces of the hitch bar and box are maintained in this seated condition by over center clamps, and when so seated, the hitch box will not shift relative to the hitch bar. The beveled surfaces however facilitate connecting the hitch bar to the hitch box while the latter is coupled to the trailer, for they guide the hitch box into precise alignment with the hitch bar when the hitch bar is forced rearwardly into the hitch box.

20 Claims, 8 Drawing Sheets

TRAILER HITCH

RELATED APPLICATIONS

This application is a continuation-in-part of application Ser. No. 819,590 filed Jan. 17, 1986, now U.S. Pat. No. 4,722,542, which is in turn a continuation-in-part of application Ser. No. 692,398 filed Jan. 18, 1985, now abandoned.

BACKGROUND OF THE INVENTION

This invention relates in general to trailer hitches, and more particularly to a rigid trailer hitch for quickly connecting a trailer to a tow vehicle, and likewise disconnecting it from the tow vehicle.

Trailers that are designed to be towed by automobiles and lightweight trucks come in a variety of sizes and weights and so do the hitches for connecting such trailers with their tow vehicles. Indeed, such hitches are designated by class. The hitches for the larger and heavier trailers usually consist of two separable components - a hitch receiver which is welded or otherwise firmly secured to the frame of the tow vehicle and a hitch bar which fits into and is connected with the hitch receiver. The latter carries a conventional hitch ball over which a socket-type coupler on the tongue of the trailer fits. The two-piece arrangement enables the user to remove at least part of the hitch from the tow vehicle when the trailer is not required, and this of course reduces the protrusion of the hitch beyond the end of the tow vehicle.

Little clearance exists between the hitch bar and the hitch receiver, and as a consequence the two must be aligned with considerable precision to enable the bar to be inserted in or removed from the receiver. As a practical matter, this requires detaching the trailer from the bar before the bar is inserted into the receiver and likewise before the bar is withdrawn from the receiver. Any transverse or vertically directed force of some magnitude will cause the bar to bind within the receiver.

Thus, coupling a trailer to the tow vehicle can be an arduous task, for it requires aligning the hitch ball on the rear of the tow vehicle with the socket-type coupler on the trailer. The larger and heavier trailers cannot be moved about manually, so the tow vehicle must be manueuvered until the hitch ball is directly under the trailer coupler.

DESCRIPTION OF THE DRAWINGS

In the accompanying drawings which form part of the specification and wherein like numerals and letters refer to like parts wherever they occur.

DETAILED DESCRIPTION

Figure 1:
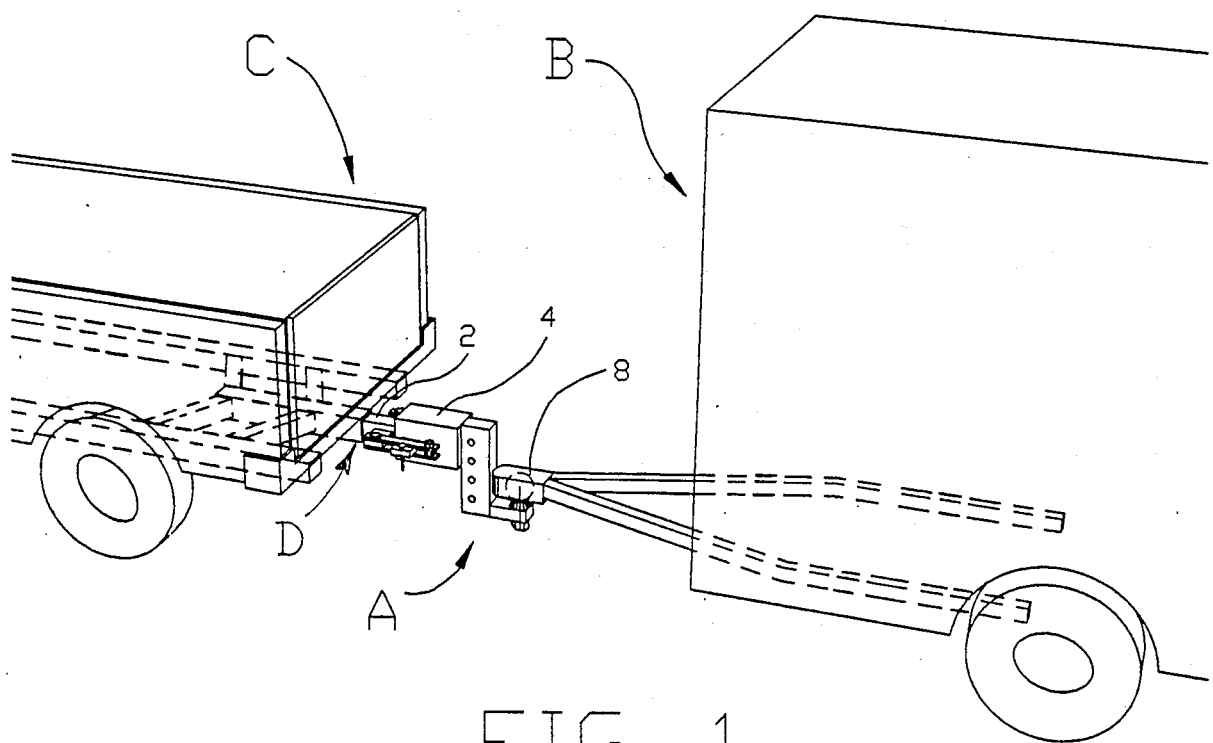
FIG. 1 is a perspective view showing a trailer connected with a tow vehicle by means of a self-aligning hitch constructed with and embodying the present invention.
Figure 9:
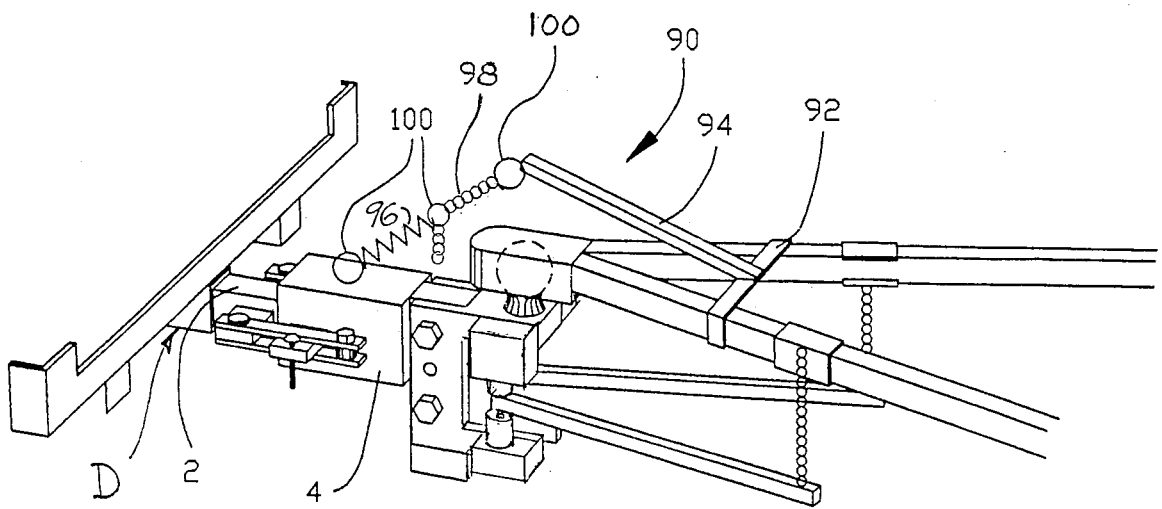
FIG. 9 is a perspective view showing a device for supporting the hitch box such that its open end is presented forwardly for reception of the hitch bar.
Figure 2:
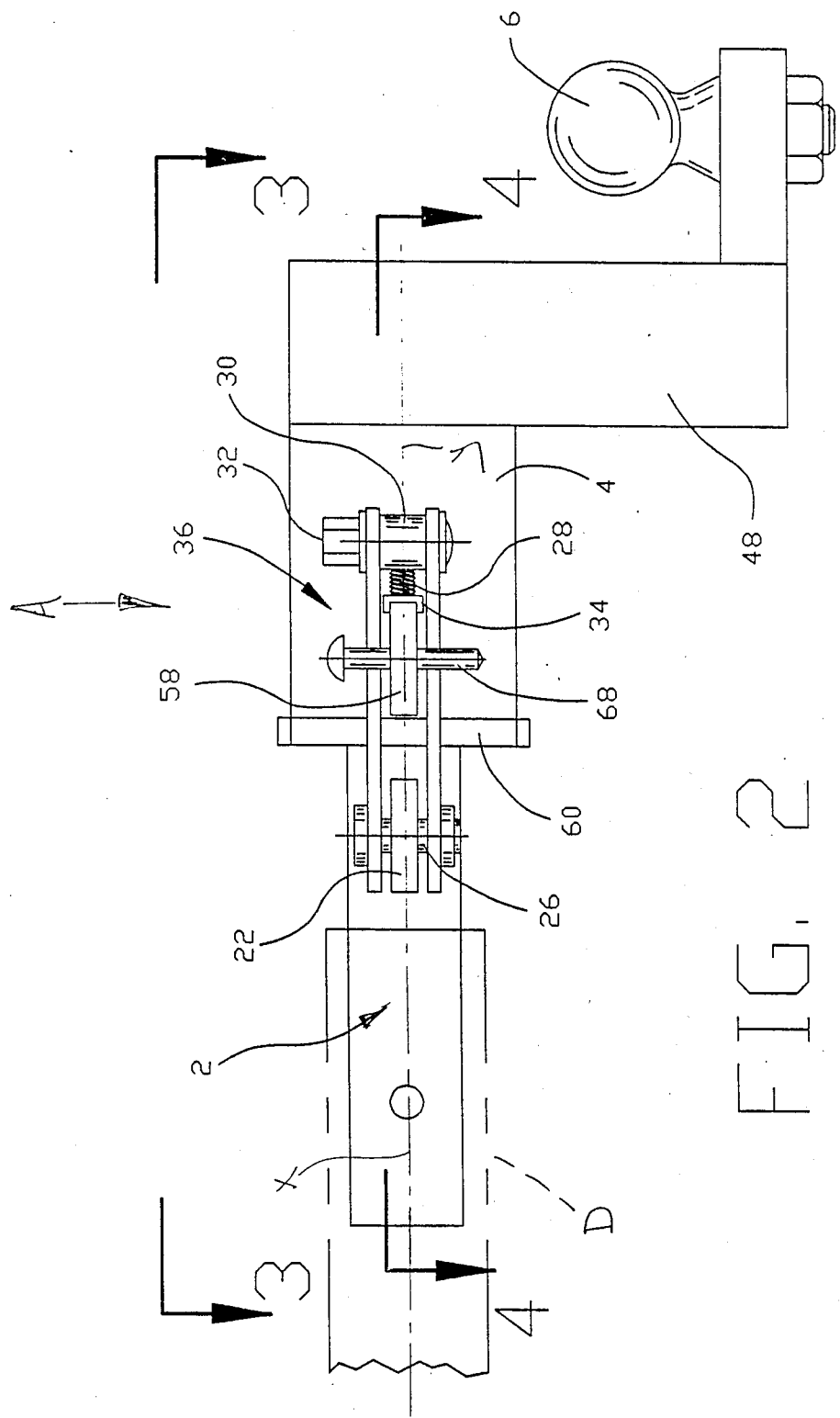
FIG. 2 is a side elevational view of the hitch taken along line 2—2 of FIG. 1.
Figure 3:
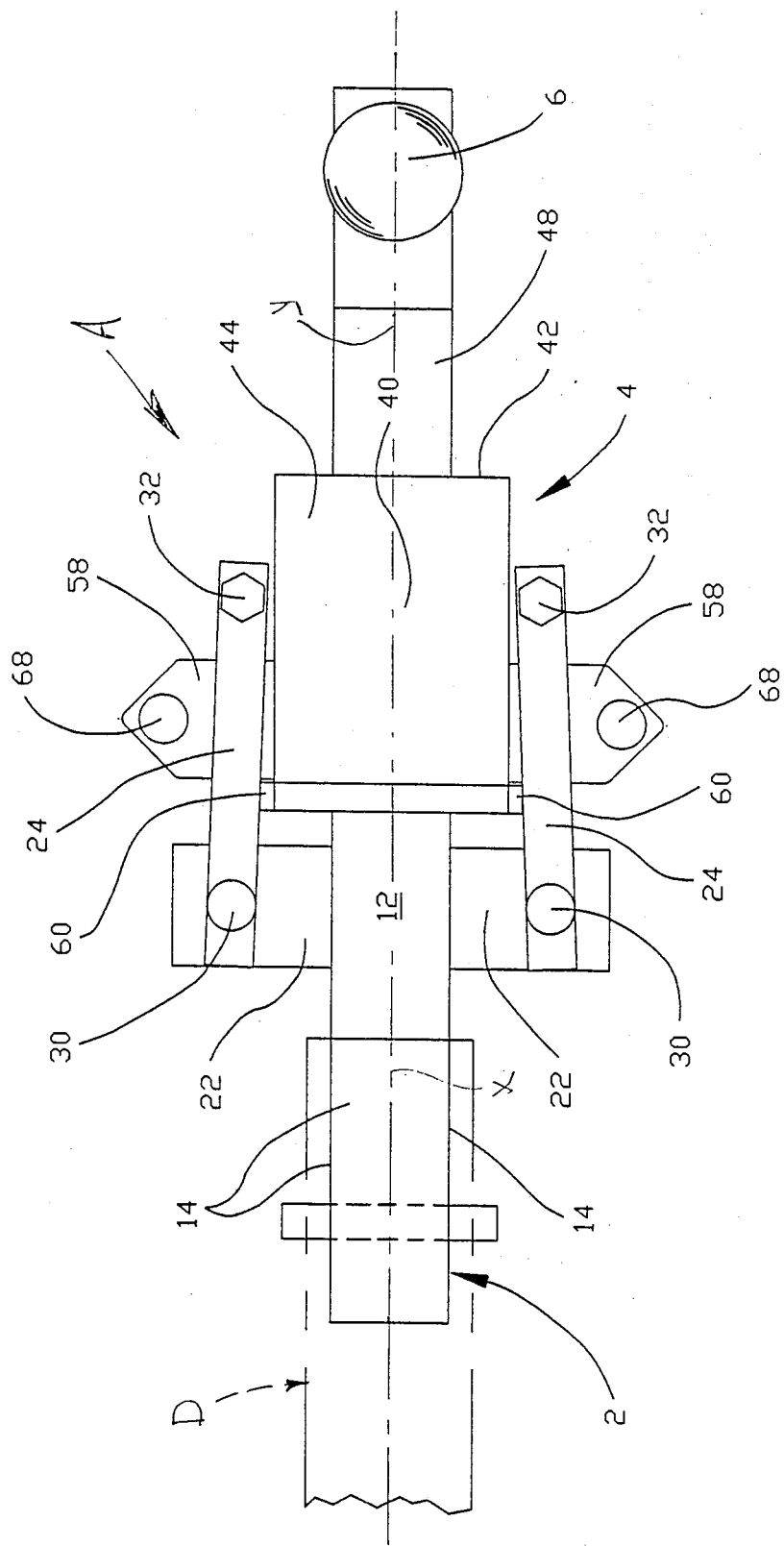
FIG. 3 is a top plan view of the hitch taken along line 3—3 of FIG. 2.
Figure 4:
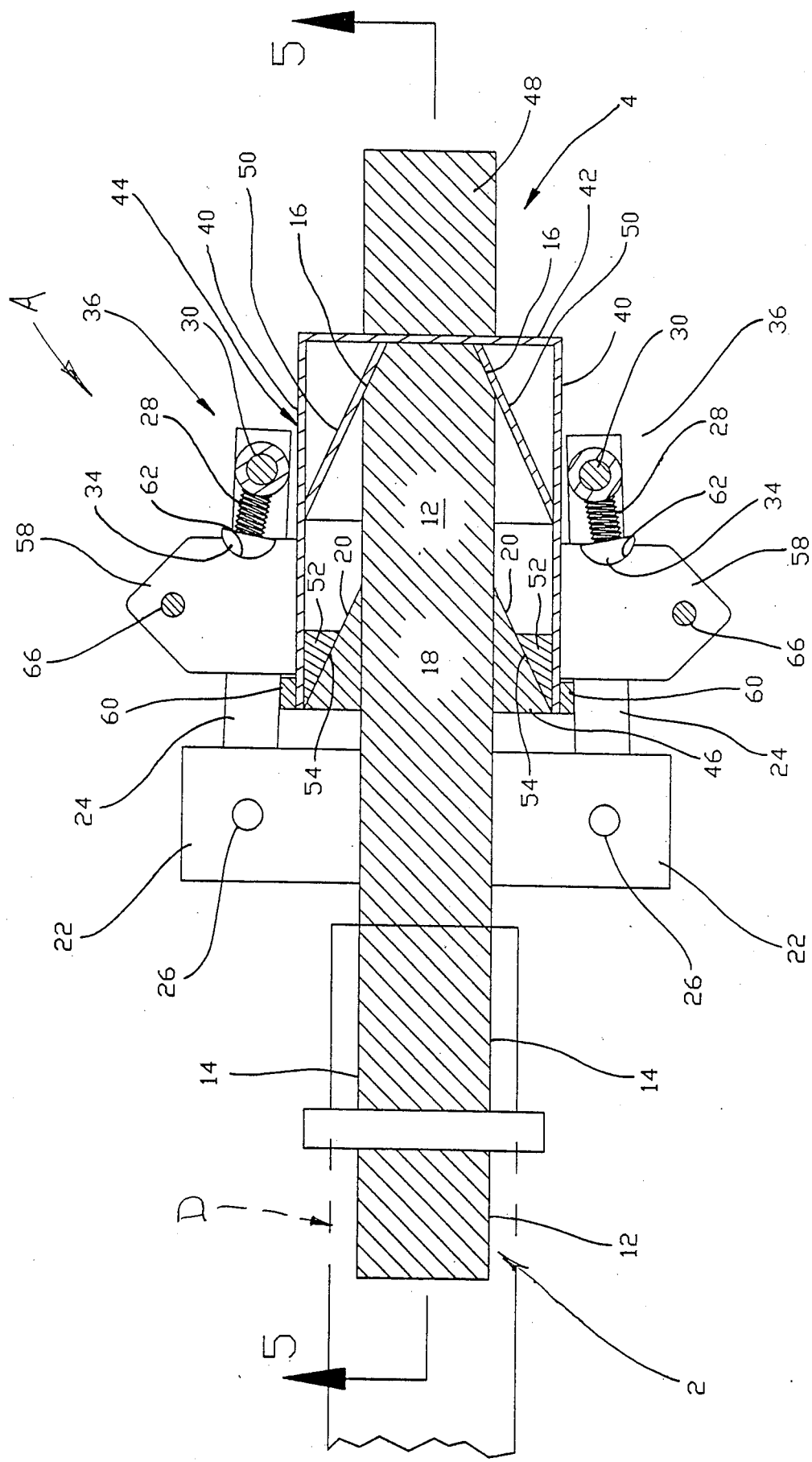
FIG. 4 is a sectional view of the hitch taken along line 4—4 of FIG. 2.
Figure 5:
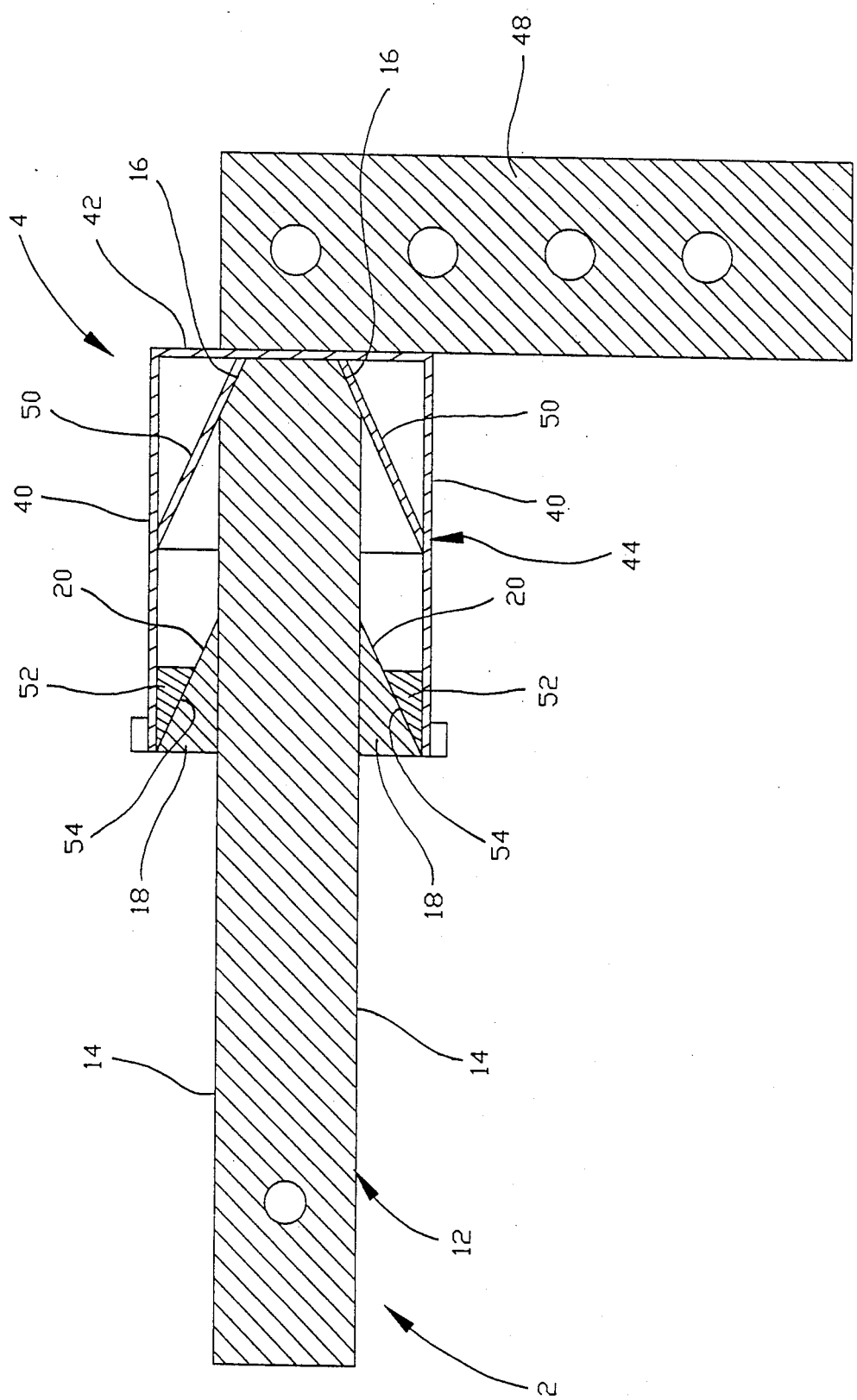
FIG. 5 is a sectional view of the hitch taken along line 5—5 of FIG. 4.
Figure 6:
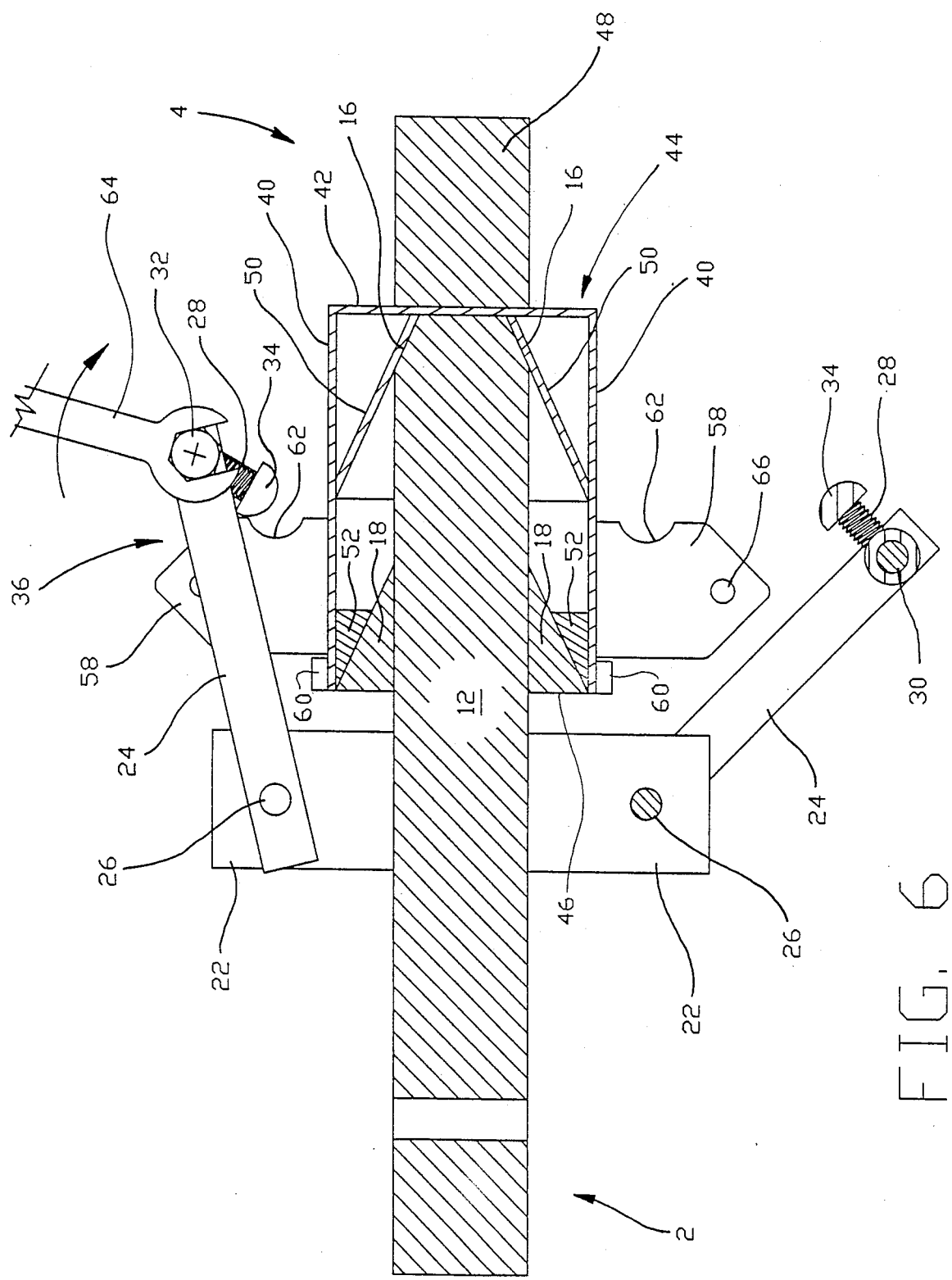
FIG. 6 is a sectional view of the hitch showing one of the overcenter clamps attached and the other overcenter clamp being rotated to its locked position.

Referring now to the drawings, a trailer hitch A for connecting a trailer B to a tow vehicle C has two basic components, namely a hitch bar 2 which is attached to the frame of the tow vehicle C and a hitch box 4 which is normally fitted over and is secured to the hitch bar 2. Actually the hitch bar 2 is recieved in and projects rearwardly out of a standard hitch receiver D that is welded or otherwise securely fastened to the frame of the tow vehicle C. The hitch bar 2 fits snugly in the hitch receiver D with very little clearance and is secured to the receiver D with a cross pin. The hitch bar 2 projects slightly beyond the end of the tow vehicle C in a generally horizontal orientation with its longitudinal axis x along the centerline of the tow vehicle C. The hitch box 4, while being open at its forward end to receive the hitch bar 2, carries a conventional hitch ball 6 at its rear end, and that ball is sized and configured to fit into a socket-type coupler 8 at the front of the trailer B although the ball 6 may be on a bracket designed to accommodate spring bars designed to redistribute the weight of the trailer B. In any event, the connection between the hitch bar 2 and hitch box 4 aligns the two and is very secure and rigid, so that the hitch box 4 is mounted in a fixed position on the frame of the tow vehicle C with its longitudinal axis y aligned with the longitudinal axis x of the hitch bar 2 and of course with the centerline of the vehicle C as well. As such the hitch ball 6 is fixed firmly in position with respect to the frame of the tow vehicle C and will not rattle about or otherwise move with respect to that frame.

The hitch 2 includes a shank 12 which extends the full length of the bar 2, it being firmly and securely attached at its forward end to the frame of the tow vehicle C. The shank 12 is rectangular in cross-section and as such has four side faces 14, two presented laterally, another presented upwardly and still another presented downwardly. At its opposite or rear end the side faces 14 merge into beveled end faces 16 which create a four-sided truncated pyramid at the rear end of the bar 2. Somewhat ahead of the beveled end faces 16, the shank 12 is fitted with four stops 18, each being located along one of the side faces 14 on the shank 12. Whereas the beveled side faces 16 are directed inwardly from the side faces 14 of the shank 12, the beveled faces 20 of the stops 18 are directed outwardly. The angle between each face 20 and the longitudinal axis x of the shank 12 should be about 20°, and the same hold true with respect to the beveled end faces 16.

Immediately ahead of the stops 18 two pivot tabs 22 project laterally from the shank 12, one from each of the two laterally presented side faces 14. The tabs 22, which are welded firmly to the shank 12, each support a connecting link 24 which is attached to it at a pivot pin 26. Actually, each link 24 consists of two sections—one located above its tab 22 and the other below the tab 22. The pin 26 of course permits the link 24 to pivot about a vertical axis relative to the hitch bar 2, and this enables the free end of the link 24 to move toward and away from the side of the hitch bar 2. The connecting links 24 are long enough to extend to the sides of the hitch box 4, with which they are engaged to hold the hitch box 4 on the hitch bar 2.

This engagement with the hitch box 4 is established through thrust links 28, there being a separate thrust link 28 at the free end of each of the connecting links 24. Each thrust link 28 normally lies between the two sections of its connecting link 24, where it extends from a pivot pin 30 which rotates about a vertical axis in the end of the connecting link 24, and the pin 30 in turn is fitted with a hexagonal head 32 which is configured to be engaged by conventional end, socket or box wrench. Actually, the pin 30 intermediate its ends has a transversely directed threaded bore through which the trhust link 28 for that pin extends, and the link 28 in this region is also threaded and indeed engaged with the threads of the bore so that the extension of the link 28 from the pin 30 can be varied merely by turning the link 28. At its free end the link 28 is provided with a convex head 34, the convex surface of which is presented away from the pin 30.

The two links 24 and 28, together with the pivot tab 22 and the pivot pins 26 and 30 constitute an over center clamp 36 that holds the hitch box 4 over the hitch bar 2.

The hitch box 4 has side walls 40 and an end wall 42 which are joined together to form a rectangular box-like enclosure 44 having an open end 46 which is presented forwardly to receive the rear end of the hitch bar 2. Two of the side walls 4 are presented laterally, while another is presented upwardly and still another downwardly. The spacing between the two laterally presented walls 40 is somewhat greater than the width of the shank 12 on the hitch bar 2, while the spacing between the upper and lower side walls 40 exceeds the height of the shank 12. The open end 46 is of course at one end of the enclosure 44, while the end wall 42 is at the opposite end. Fastened securely to the end wall 42 is a bracket 48 to which the hitch ball 6 is fastened. The bracket 48 may in the alternative serve as a place for attaching a ball mount of the type used on weight distributing hitches to redistribute the weight of a trailer.

The enclosure 44 is large enough to receive the rear end of the shank 12 for the hitch bar 2 and indeed that end of the shank 12 fits through the open end 46 of the enclosure 44 to be received within the enclosure 44. Within its interior, the enclosure 44 has four angulated walls 50 which extend inwardly from the side walls 40 and converge toward the end wall 42, there being a different angulated wall 50 along each side wall 40. The walls 50 provide inwardly presented beveled faces within the enclosure 44 and the angle between each angulated wall 50 and the axis y of the hitch box 4 corresponds to the angle between the beveled end faces 16 of the hitch bar shank 12 and axis x of the hitch bar 2. Indeed, when the hitch bar 2 is fullly inserted into the hitch box 4, the beveled end faces 16 of the shank 12 seat against the angulated walls 50 in the enclosure 44 of the hitch box 4. In addition, the enclosure 44 within its interior is provided with tapered stops 52, there being a separate stop 52 fastened rigidly against the interior surface of each side wall 40 immediately inwardly from the open end 46 of the enclosure 44. The stops 52 have beveled surfaces 54 which are presented inwardly and toward the open end 46, with the angle between each surface 54 and the axis y of the hitch box 4 being equal to the angle between the beveled face 20 of the stops 18 for the hitch bar 2 and the axis x of the hitch bar 2. Moreover, the thickness and positioning of the tapered stop 52 is such that when the hitch bar 2 is fully inserted into the enclosure 44 of the hitch box 4, that is when the beveled end faces 16 on the hitch bar shank 12 seat against the angulated walls 48 of the enclosure 44, the beveled faces 20 of the stops 18 for the hitch bar 2 seat snugly against the beveled faces 54 on the stops 52 of the hitch box 2. Indeed, when an axially directed seating force is applied to the hitch bar 2 and hitch box 4 so as to urge the former into the latter, the beveled end faces 12 of the bar 2 seat with even greater force against the angulated walls 50 of the hitch box 4 and the same holds true with regard to the beveled faces 54 on the stops 52 of the hitch box 4 and the beveled faces 20 on the stops 18 of the hitch bar 2.

That axially directed seating force is derived from the over center clamps 36. More specifically, the enclosure 46 along each of its laterally presented side walls 40 is provided with outwardly directed locking tabs 58, which also constitute parts of the clamps 36, and in addition stop bars 60 which are located between the tabs 58 and the open end 46 of the enclosure 44. Both the tabs 58 and bars 60 are welded firmly to the laterally presented side walls 40 of the enclosure 46, and while both project from their respective side walls 40, the tabs 58 project substantially farther than the bars 60. The tabs 58 furthermore are located directly opposite to each other at the elevation of the longitudinal axis y for the enclosure 44, and each has a concave recess 62 in its rearwardly presented margin. Moreover, the contour of the recess 62 conforms to the convex surfaces on the heads of the thrust links 28. Indeed, each recess 62 receives the convex head 34 on one of the thrust lines 28, with the link 28 being swung over center so-to-speak so that the inner margin of the connecting link 24 to which that thrust link 28 is attached is against the adjacent stop bar 64. In other words, each thrust link 28 is adjusted such that when the shank 12 of the hitch bar 2 is fully inserted in the enclosure 44 of the hitch box 4, the thrust link 28 and the connecting link 24 to which it is connected can swing from a slighting outwardly directed condition, over center, to a slightly inwardly directed condition in which the side of the connecting link 24 is against the stop bar 60. During this movement, the convex head 34 of the thrust link 28 pivots in the concave recess 62 of the tab 58. When the connecting link 24 and thrust link 28 are so disposed, the thrust link 28 lies between the two sections of the connecting link 24, whereas the locking tab 58 projects through the spaced between those sections.

When the connecting links 24 and thrust links 28 on both sides of the enclosure 44 for the hitch box 4 are brought over their respective centers, the beveled faces 20 on the stop 18 of the hitch bar 2 seat firmly against the beveled faces 54 on the stops 52 of the hitch box 4, and likewise the beveled end faces 16 on the hitch bar seat firmly against the angulated walls 50 within the enclosure 44 of the hitch box 4. This seating of beveled surfaces prevents the hitch box 4 from moving laterally or vertically, even most minutely, with respect to the hitch box 2, and of course the links 24 and 28 prevent the hitch box 4 from pulling away from the hitch bar 2.

The over center movement of each over center clamp 36 is most easily effected with a wrench 64 applied to the hexagonal head 32 for the pivot pin 30 which holds the links 24 and 28 together. In particular, to connect the hitch box 4 with the hitch bar 2, the enclosure 44 of the box 4 is fitted over the free end of the shank 12 on the hitch bar 2 until the beveled end faces 16 of the bar 2 come against angulated walls 50 of the enclosure 44, and the beveled faces 20 for the hitch bar stops 18 bear against the beveled faces 54 for the hitch box stops 52. Then the connecting link 24 and thrust link 28 on one side of the hitch box enclosure 44 are manipulated to bring the convex head 34 of the thrust link 28 into the concave recess 62 of the tab 58. With the links 24 and 28 so postioned, the wrench 64 is placed over the hexagonal head 32 for the pivot pin 26 and turned in the direction which causes the pin 30 and the ends of the two links 24 and 28 that are connected by it to move toward the enclosure 44. Indeed, enough torque is applied at the wrench 64 to cause the link 28 to move over center, so-to-speak, and to carry the longer connecting link 24 with it. The movement over center continues until the side of the connecting link 24 comes against the stop bar 60 on the side of the enclosure 44. At this time the wrench 64 is released from the head 32 of the pivot pin 30. The other set of links 24 and 28 is engaged with the other tab 58 and moved over center to a locked position in the same manner.

The two sets of links 24 and 28 should remain over center in their locked positions once they are brought to those positions with the aid of the wrench 64, but to provide an extra measure of safety, each locking tab 58 is provided with an aperture 66 which lies immediately beyond the outer surface of the connecting link 24 when the connecting link 24 and its thrust link 28 are in the over centered or locked position. The aperture 66 receives a pin 68 which likewise lies directly outwardly from the connecting link 24. As such, the pin 68 blocks the connecting link 24 and prevents it from moving outwardly, away from its over center position. Of course, before one attempts to swing either set of links 24 and 28 outwardly in order to disconnect hitch box 4 from the hitch bar 2, the pin 68 which lies along those links 24 and 28 must be removed from its tab 58.

OPERATION

The hitch bar 2, being relatively light in weight, is inserted manually into the hitch receiver D and secured with a pin, so that is mounted in a firm and fixed position with respect to the frame of the tow vehicle C. While the hitch box 4 may be detached with relative ease from the trailer B merely by releasing the coupler 8 of the trailer B from the hitch ball 6 on the end of the hitch box 4, the hitch box 4 is intended to remain attached to the trailer B. To couple the trailer B to the tow vehicle C then becomes merely a matter of inserting the hitch bar 2 into the hitch box 4 and then engaging the thrust links 28 of the former with the locking tabs 58 on the latter and moving those links 28 over center to their locked positions.

This connection is accomplished by positioning the hitch box 4 so that its open end 46 is presented away from the trailer B. Then the tow vehicle B is maneuvered until the shank 12 of the hitch bar 2 aligns reasonably well with the open end 46 of the enclosure 44. Thereupon, the tow vehicle C is moved rearwardly to in effect drive its hitch bar 2 into the hitch box 4. As the shank 12 of the hitch bar 2 enters the open end 46 of the enclosure 44 it encounters the beveled stops 52 within the enclosure 44, and these stops 52 tend to center the hitch box 4 over the hitch bar 2. Continued rearward movement of the hitch bar 2 brings the beveled end faces 16 at the end of its shank 12 against angulated walls 50 of the enclosure 44, and simultaneously the beveled stops 18 of the hitch bar 2 comes against the beveled stops 52 of the enclosure 44 for the hitch box 4, the beveled faces 20 of the former seating, perhaps somewhat loosely, against the beveled faces 54 of the latter. In short, the shank 12 of the hitch bar 2 moves into a fully inserted position within the enclosure 44 of the hitch box 4, and in that position the longitudinal axis x of the hitch bar shank 12 generally aligns with the longitudinal axis y of the hitch box enclosure 44.

With the hitch box 4 so positioned over the hitch bar 2 - and in effect centered with respect to it - one of the over center clamps 36 is engaged with the hitch box 4 and moved over center. In particular the connecting link 24 of that clamp 36 is moved inwardly toward the enclosure 44 and as it passes over the locking tab 58 which projects from the side of the enclosure 44, the thrust link 28 which is connected to it is aligned with the concave recess 62 in the locking tab 58 and indeed its convex head 34 is inserted into that recess. Thereupon, the wrench 64 is placed over the hexagonal head 32 of the pivot pin 30 from which the thrust link 28 projects, and it is turned to pivot the thrust link 28 about its convex head 34 which is confined in the concave recess 62 of the tab 58. The torque which is applied to the pivot pin 30 moves the two links 24 and 28 at the ends where they are joined by the pin 30 toward the enclosure 44 and indeed they pass over center and come to rest with the inner edges of the connecting link 24 bearing against the stop bars 60. This brings the beveled end faces 16 of the shank 12 snugly against the angulated walls 50 of the enclosure and likewise the beveled stop 18 of the hitch bar 2 snugly against the beveled stop 52 of the enclosure 44, thereby eliminating all free motion between the hitch bar 2 and hitch box 4. The other connecting link 24 and thrust link 28 are engaged with the other locking tab 58 in a similar manner. The retaining pins 68 are then inserted into the apertures 66 to insure that the connecting links 24 and thrust links 28 remain in their over center positions wherein they are engaged with the locking tabs 58.

MODIFICATIONS

Figure 7:
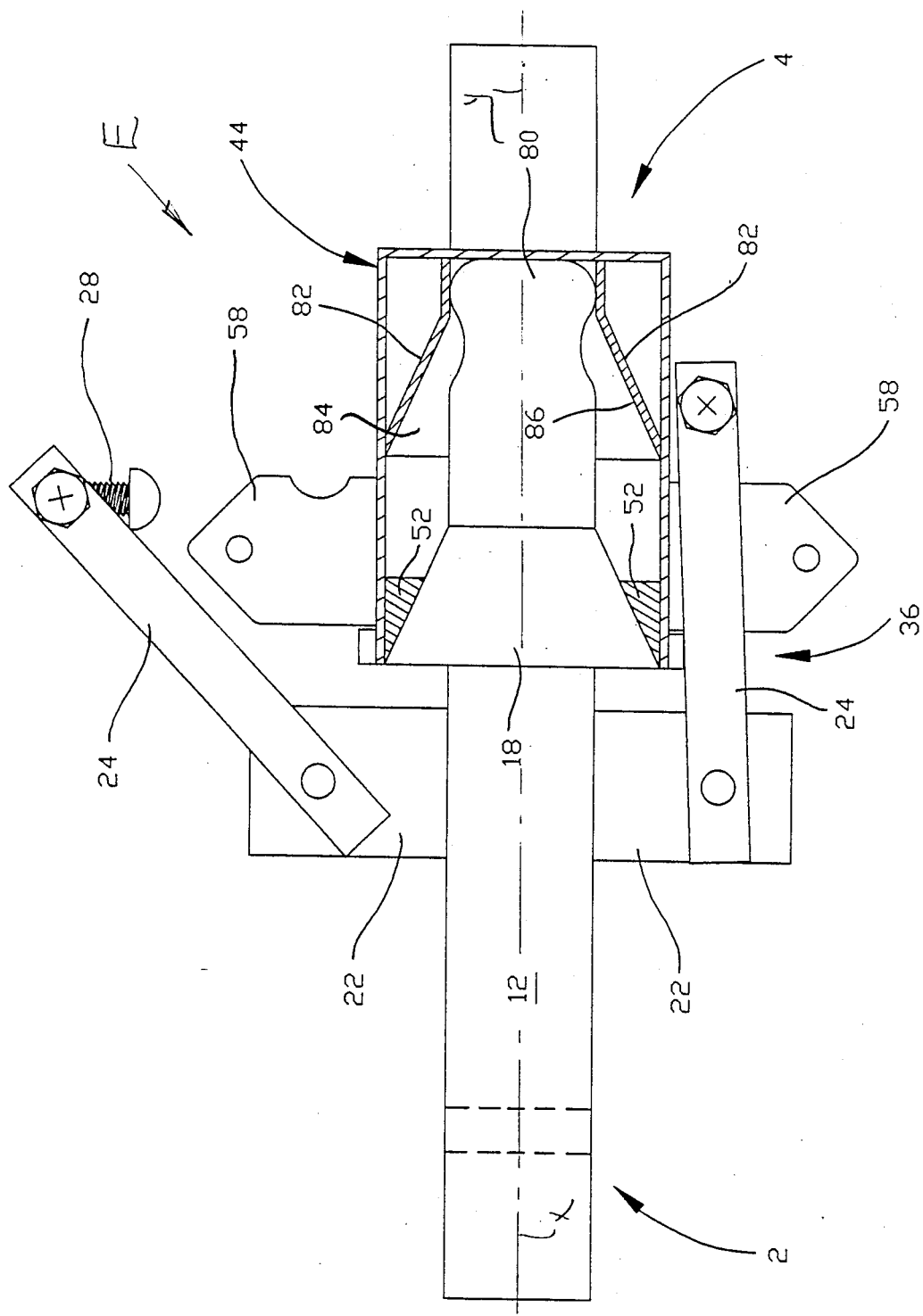
FIG. 7 is a sectional view of a modified hitch.
Figure 8:
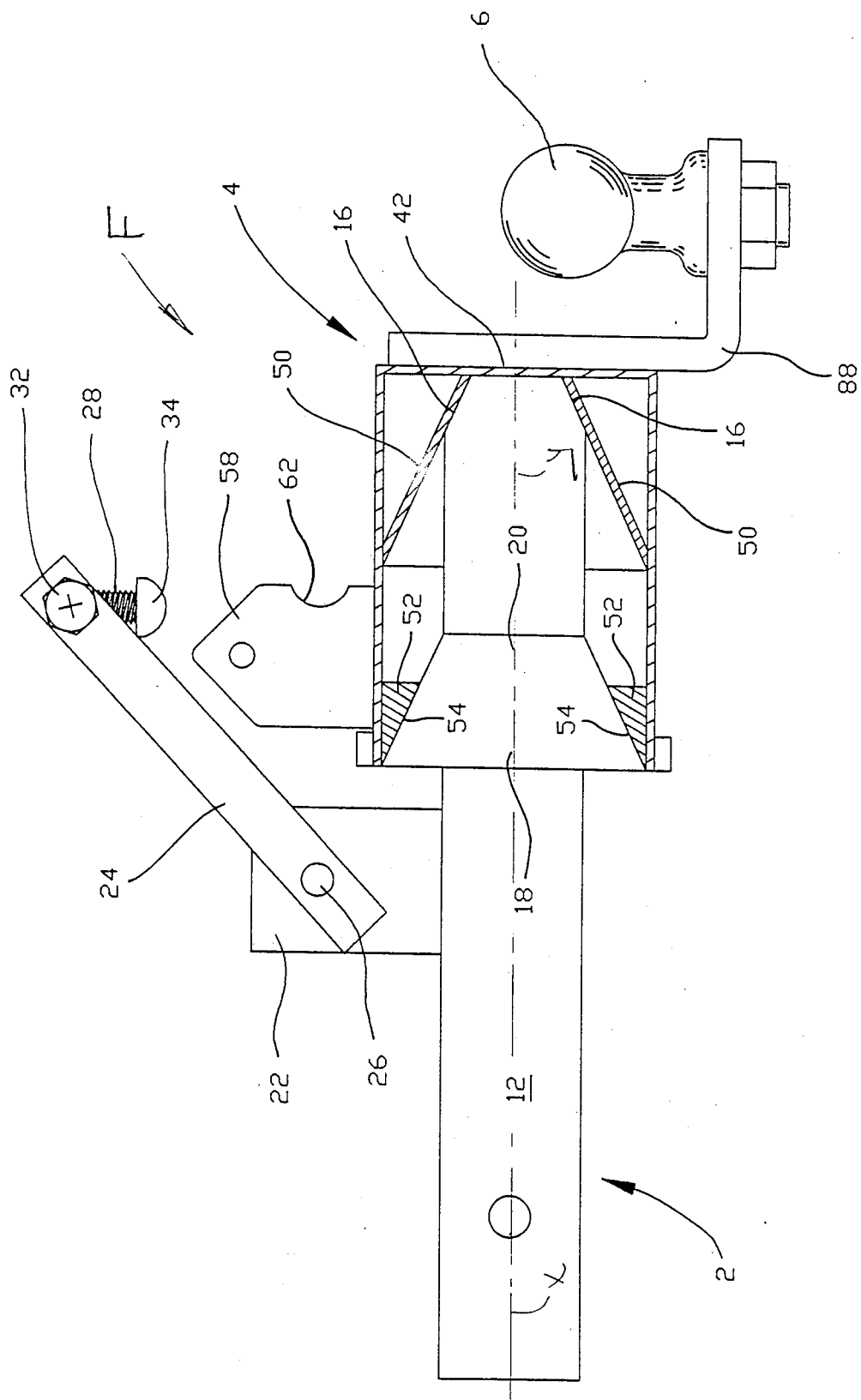
FIG. 8 is a sectional view of another modified hitch.

A modified trailer hitch E (FIG. 7) is quite similar to the hitch A, except that the shank 12 of its hitch bar 2, in lieu of having beveled end faces 16, is rounded in the form of an entry ball 80. The enclosure 44 of the hitch box 4, on the other hand, has walls 82 which are arranged to form a socket 84 and a tapered surface 86 that leads into the socket 84. The socket 84 is just large enough to receive the entry ball 80 on the hitch bar 2 with minimum clearance vertically and laterally, and when the ball 80 is so received, the longitudinal axis x of the hitch bar 2 aligns with the longitudinal axis y of the hitch box 4. Moreover, the beveled faces 20 on the stops 18 of the hitch bar 2 seat against the beveled faces 54 on the stops 52 in the enclosure 44 of the hitch box 4 when the entry ball 80 is fully inserted into the socket 84. This condition is maintained, that is the stops 18 of the hitch bar 2 are held firmly against the stops 52 of the hitch box 4, by the over center clamps 36.

Still another modified hitch F is quite similar to the hitch A, but is suited for trailers B of lesser weight. The hitch F has a hitch bar shank 12 and a hitch box enclosure 44 which are idential to their counterparts in the hitch A. However, the hitch F has only one center calmp 36 for holding its hitch bar 2 and hitch box 4 together. The pivot tab 22 of that clamp projects upwardly from the upwardly presented side face 14 of the shank 12, and likewise the locking tab 58 projects upwardly from the upwardly presented side wall 40 of the enclosure 44. The hitch ball 6 is attached to an L-shaped bracket 88 which is secured to the rear wall 42 of the enclosure 44.

It is convenient to leave the hitch box 4 connected with the trailer B, but the connection between the two resides in the ball and socket joint formed by hitch ball 6 on the hitch box 4 and the coupler 8 of the trailer B. Unless otherwise supported, the hitch box 4 will depend from the trailer coupler 8 with its open end 46 presented toward the pavement, instead of forwardly for reception of the shank 12 on the hitch bar 2.

To position the hitch box 4 for reception of the hitch bar shank 12, the trailer is fitted with a support 90 including a bracket 92 which is connected securely to the trailer frame of the trailer B, preferably by clamping around one of the arms which converge to form the tongue of the trailer B. The bracket 92 carries an arm 94 which is fastened securely to it and projects both upwardly and forwardly, so that it assumes a generally oblique orientation, with its free end being located directly above the socket in the coupler B for the trailer B, and likewise directly above the hitch ball 6. Here a coil-type tension spring 96 is connected to the arm 94 through a short chain 98 and the spring 96 and chain 98 extend obliquely downwardly to the forward end of the hitch box 4 to which the former is connected at a ring 100 which is attached to the upwardly presented side wall 40 on the hitch box enclosure 44.

This invention is intended to cover all changes and modifications of the example of the invention herein chosen for purposes of the disclosure which do not constitute departures from the spirit and scope of the invention.

What is claimed is:

1. A trailer hitch comprising: a hitch bar having a shank and beveled surfaces located along the shank; a hitch box including box-like enclosure having an open end through which the shank of the hitch bar projects and also having beveled surfaces which conform to and bear against the beveled surfaces along the shank, the inclination and arrangement of the beveled surfaces on the shank and within the enclosure being such that when the beveled surfaces of the shank are seated against the beveled surfaces of the enclosure, the hitch box cannot move laterally with respect to the hitch bar; and an over center clamp connected to the hitch bar and to the hitch box and urging the two together such that the beveled surfaces on the hitch bar seat against the beveled surfaces on the hitch box, the over center clamp having elements which pivot relative to each other and relative to the hitch bar and hitch box as well, from a position in which they permit the shank to shift within the enclosure and the beveled surfaces on each to separate, to a center position in which the axes about which the elements pivot are essentially aligned side-by-side and the elements urge the beveled surfaces on the shank and enclosure snugly together, to an over center position slightly beyond the center position wherein the beveled surfaces remain snugly together.

2. A trailer hitch according to claim 1 wherein the beveled surfaces of the hitch bar shank are presented outwardly and toward that end of the shank that is within the enclosure of the hitch box, and the beveled surfaces within the hitch box enclosure are presented inwardly and toward the open end of the enclosure.

3. A trailer hitch according to claim 2 wherein the hitch bar shank has a longitudinal axis and the hitch box enclosure has a longitudinal axis which aligns with the axis of the hitch bar and the angle between the beveled surfaces of the hitch bar shank and the longitudinal axis of the hitch bar is substantially equal to the angle between the beveled surfaces of the hitch box enclosure and the longitudinal axis of the hitch box.

4. A trailer hitch according to claim 3 wherein the hitch bar shank has four side faces and a beveled surface of the hitch bar is located along each side face; and wherein the hitch box enclosure has four side walls and a beveled surface of the hitch box is located along each side wall.

5. A trailer hitch according to claim 4 wherein the beveled surfaces of the hitch box are located at the open end of the enclosure; and wherein the beveled surfaces of the hitch bar are offset from one end of the shank so that the shank projects beyond the beveled surfaces that are along it.

6. A trailer hitch according to claim 5 wherein the shank at its one end has a second beveled surfaces and the hitch box within its enclosure, remote from the open end of that enclosure, has second beveled surfaces which seat against the second beveled surfaces on the hitch bar shank.

7. A trailer hitch according to claim 6 wherein the one end of the hitch bar shank is generally rounded and the hitch box enclosure, remote from its open end, is provided with a socket which receives the rounded end of the shank such that a relatively snug fit exists between the rounded end and the surfaces of the socket.

8. A trailer hitch according to claim 7 wherein the hitch box enclosure further has a tapered surface that leads to the socket.

9. A trailer hitch comprising: a hitch bar having a shank and beveled surfaces located along the shank; a hitch box including a box-like enclosure having an open end through which the shank of the hitch bar projects and also having beveled surfaces which conform to and bear against the beveled surfaces along the shank, the inclination and arrangement of the beveled surfaces on the shank and within the enclosure being such that when the beveled surfaces of the shank are seated against the beveled surfaces of the enclosure, the hitch box cannot move laterally with respect to the hitch bar; and an over center clamp connected to the hitch bar and to the hitch box and urging the two together such that the beveled surfaces on the hitch bar seat against the beveled surfaces on the hitch box, the over center clamp including a first tab on the hitch bar and a second tab on the hitch box, a first link pivotally connected at one of its ends to one of the tabs, and a second link connected to the other end of the first link and having a free end which engages the other tab.

10. A trailer hitch according to claim 9 wherein the over center clamp further comprises a pivot pin for pivotally connecting the first link to the second link, the second link being attached to the pivot pin such that it will rotate with the pivot pin, the pivot pin having an exposed head which is configured to be engaged by a tool so that the tool can apply torque to the pin to rotate the pin and the second link over center.

11. A trailer hitch according to claim 10 wherein the second link has a free end provided with a convex surface and the tab which is engaged by the second link has a concave recess which receives the convex free end of the second link.

12. A trailer hitch according to claim 10 wherein the first link includes two sections, one opposite each face of the two tabs so that the tabs project through the second link, and the second link projects from the pivot pin in the space between the two sections.

13. In combination with first and second vehicles, one of which is towed by the other, a hitch for connecting the two vehicles, said hitch comprising: a hitch bar attached to and projecting from one of the vehicles and having a shank that is provided with beveled surfaces which are presented outwardly and generally away from the vehicle to which the hitch bar is attached; a hitch box attached to the other vehicle and having an enclosure provided with an open end that is presented away from the vehicle to which the hitch box is attached, the open end being large enough to receive the shank of the hitch bar, the enclosure containing beveled surface which are arranged to seat against the beveled surfaces of the hitch bar when the hitch bar shank is inserted through the open end of the hitch box enclosure; and an over center clamp for holding the hitch bar shank within the hitch bar enclosure with the beveled surfaces of the hitch bar seated against the beveled surfaces of the hitch box, the over center clamp having elements which pivot relative to each other and relative to the hitch bar and hitch box as well, from a position in which they permit the shank to shift within the enclosure and the beveled surfaces on each to separate, to a center position in which axes about which the elements pivot lie in essentially the same plane and the elements urge the beveled surfaces on the shank and enclosure snugly together, to an over center position slightly beyond the center position wherein the beveled surfaces remain snugly together.

14. The combination according to claim 13 wherein the hitch box cannot move laterally or vertically with respect to the hitch bar while the beveled surfaces of the hitch bar are seated against the beveled surfaces of the hitch box.

15. The combination according to claim 13 wherein the hitch box is connected to the towed vehicle at a ball and socket joint; and further comprising means on the towed vehicle for holding the hitch box such that the open end of its enclosure opens generally forwardly when the hitch bar is removed from the hitch box.

16. In combination with first and second vehicles, one of which is towed by the other, a hitch for connecting the two vehicles, said hitch comprising: a hitch bar attached to and projecting from one of the vehicles and having a shank that is provided with beveled surfaces which are presented outwardly and generally away from the vehicle to which the hitch bar is attached; a hitch box attached to the other vehicle and having an enclosure provided with an open end that is presented away from the vehicle to which the hitch box is attached, the open end being large enough to receive the shank of the hitch bar, the enclosure containing beveled surfaces which are arranged to seat against the beveled surfaces of the hitch bar when the hitch bar shank is inserted through the open end of the hitch box enclosure; and an over center clamp for holding the hitch bar shank within the hitch box enclosure with the beveled surfaces of the hitch bar seated against the beveled surfaces of the hitch box, the over center clamp including a first tab on the hitch bar and a second tab on the hitch box, a first link pivotally connected at one of its ends to one of the tabs, and a second link pivotally connected to the other end of the first link and having a free end which engages the other tab.

17. The combination according to claim 16 wherein the over center clamp further comprises a pivot pin for pivotally connecting the first link to the second link, the second link being attached to the pivot pin such that it will rotate with the pivot pin, the pivot pin having an exposed head which is configured to be engaged by a tool so that the tool can apply torque to the pin to rotate the pin and the second link over center.

18. The combination according to claim 17 wherein the second link has a free end provided with a convex surface and the tab which is engaged by the second link has a concave recess which receives the convex free end of the second link.

19. The combination according to claim 18 wherein the first link includes two sections, one opposite each face of the two tabs so that the tabs project through the second link, and the second link projects from the pivot pin in the space between the two sections.

20. A trailer hitch comprising: a hitch bar having a shank provided with side faces and beveled surfaces located along the side faces; a hitch box including side walls that form a box-like enclosure having an open end through which the shank of the hitch bar projects and also having beveled surfaces which conform to and bear against the beveled surfaces along the side surfaces of the shank, the inclination and arrangement of the beveled surfaces on the shank and within the enclosure being such that when the beveled surfaces of the shank are seated against the beveled surfaces of the enclosure, the hitch box cannot move laterally or vertically with respect to the hitch bar, the hitch box and hitch bar being completely separable from each other; and individual and separate clamp means located along the side faces of the hitch bar and the side walls of the hitch box for urging the hitch bar and hitch box together such that the beveled surfaces on the hitch bar seat against the beveled surfaces on the hitch box, the clamp means having elements which can be disconnected to enable the hitch box and hitch bar to be completely separated from each other.

* * * * *